Sept. 12, 1944.   L. MARICK   2,358,081
BROODER
Filed Jan. 2, 1941
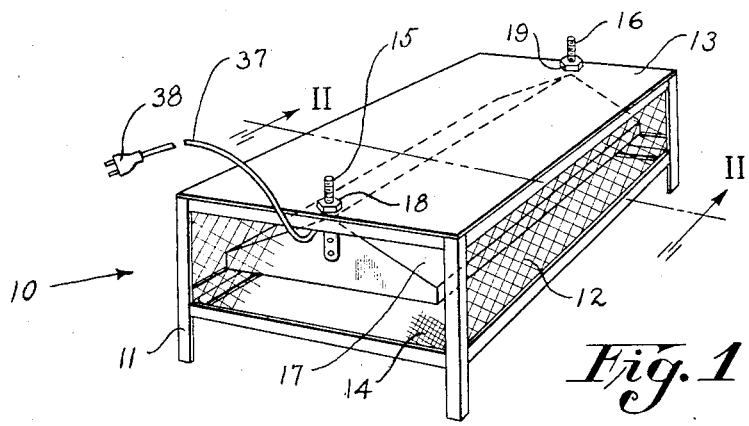
*Fig. 1*
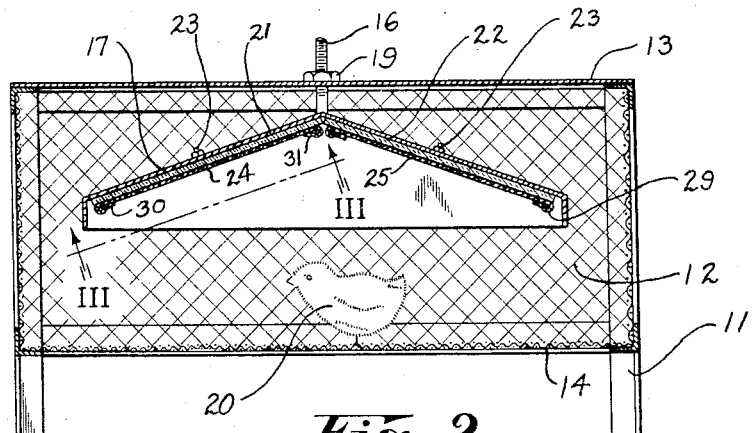
*Fig. 2*
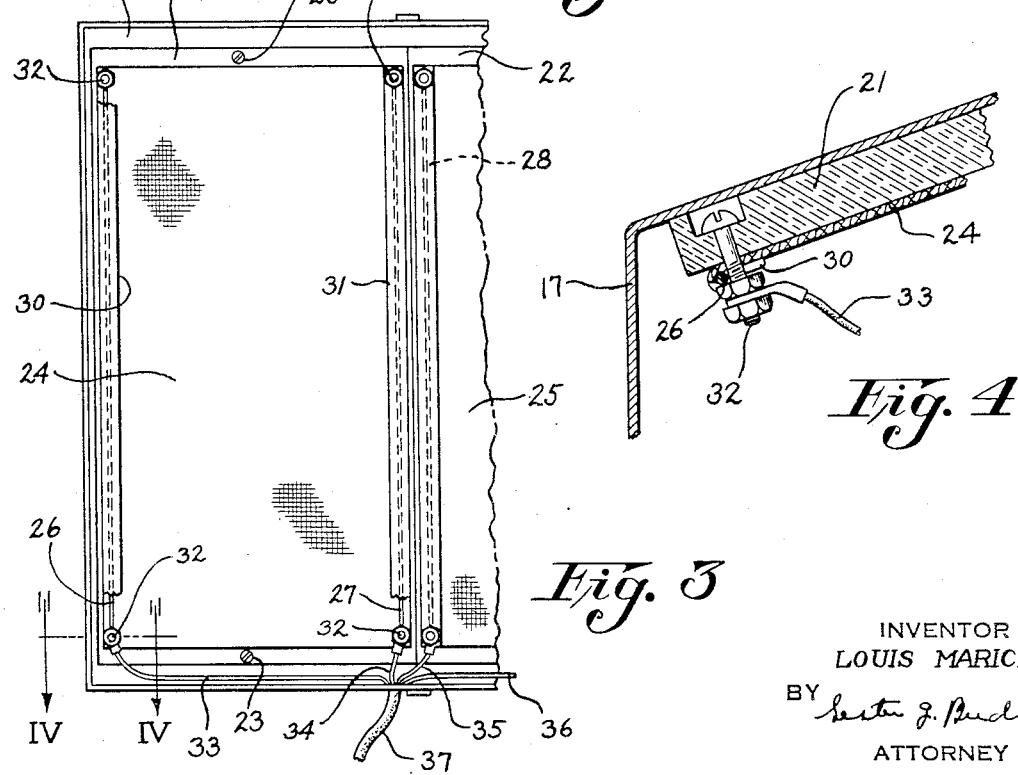
*Fig. 3*
*Fig. 4*
INVENTOR
LOUIS MARICK
BY Lester J. Budlong
ATTORNEY Patented Sept. 12, 1944

2,358,081

UNITED STATES PATENT OFFICE 2,358,081

BROODER

Louis Marick, Grosse Pointe Farms, Mich., assignor to United States Rubber Company, New York, N. Y., a corporation of New Jersey Application January 2, 1941, Serial No. 372,698

2 Claims. (Cl. 219—35)

This invention relates to poultry brooders and, in particular, to heating elements for brooders.

It is well known that in the successful rearing of poultry it is essential that the environment of the early stages of their existence be in keeping with their delicate condition. Experience has proved that it is necessary to the healthy condition of newly hatched poultry to have their places of confinement, commonly known as brooders, provided with heating means. There are several conventional devices for accomplishing this, one of which includes the use of electrically heated wire elements disposed in the upper region of the brooder. This method of heating has several disadvantages. Electrical wire elements are usually excessively hot in close proximity thereto and have a tendency to concentrate more heat in the region directly beneath them, resulting in uneven heating over the floor area of the brooder. Elements of this type also constitute a fire hazard and precautions must be taken against this danger. It is also necessary to provide a safety screen over the exposed elements to prevent the occupants of the brooder from coming in contact with the elements. The use of hot water circulation for heating likewise is undesirable in that controlled variable temperatures are not easily maintained.

The present invention contemplates the heating of poultry brooders in such a manner as to distribute heat uniformly over a relatively large area and to provide a healthful radiant heat. The arrangement is neat in appearance and requires a minimum of space inside the brooder. It can be readily installed and adapted to any desired shape of brooder. It is economical in power consumption due to the area from which heat is dissipated at an even temperature. Fire hazard is reduced to a minimum and the relatively low temperature of the heating elements in no way endangers the life of the occupants of the brooder.

The features of the invention will be further understood from the following description when read in connection with the accompanying drawing, in which:

Fig. 1 is a perspective view of a brooder electrically heated in accordance with the present invention;

Fig. 2 is a transverse view, in section, taken along the lines II——II of Fig. 1;

Fig. 3 is a view of a portion of the heating surface taken along lines III—III of Fig. 2, illustrating the electrical wiring; and, Fig. 4 is an enlarged view, in section, of an electrical connection, taken along lines IV—IV of Fig. 3.

Referring to the drawing and, in particular, to Fig. 1, I show a conventional type of brooder 10 of rectangular shape, comprising an outer frame 11, supporting a wire screen 12 which forms the sides and ends, a top sheet metal cover 13, and a close mesh wire flooring 14. Contained within the brooder and supported by adjusting screws 15 and 16 is a sheet metal canopy 17. In addition to serving as a suspending medium, the screws 15 and 16, cooperating with the nuts 18 and 19, respectively, also permit the heating unit to be raised in accordance with the growth of the brooder occupants, such as a baby chick 20, Fig. 2. The sheet metal canopy 17 extends almost the entire length and width of the brooder. It acts as a means to support the heating unit in operative position.

Positioned on the under side of the sloped portions of the canopy 17 are insulating members 21 and 22 (Fig. 2) held in place by bolts 23. The members 21 and 22 can be composed of any commercially known material having insulating qualities capable of preventing heat loss when the heating units are attached thereto. "Celotex" is such a material.

The electrically heated panels embodying my invention may be constructed to conform with any desired shape of brooder while maintaining equal efficiency throughout. It is generally accepted in the heating of brooders that the source of heat be such that warm air is applied to the backs of the occupants, this being in accordance with natural conditions.

The heating units are constructed as shown in Fig. 2 and Fig. 3, consisting of fabric sheets 24 and 25. The sheets 24 and 25 may be of woven cotton fabric or other textile material. One or both surfaces of these sheets is coated with an electrically conducting composition, such, for example, as a rubber compound containing sufficient electrically conducting carbon particles to make an electrical conductor of the sheets 24 and 25. The degree of conductivity in the prepared sheets is dependent on the type of carbon and the carbon content of the compound deposited thereupon. For instance, the composition may have a large percentage of carbon or successive coats of a compound having fewer carbon particles. The desired temperature may be attained by employing either of the two methods.

While I have illustrated a preferred construction of heating unit in the use of a fabric sheet, equally good results may be obtained by coating materials other than fabric, such as asbestos, or by applying the compound containing the carbon particles directly to the insulating members 21 and 22. A sheet formed of rubber or other plastic material containing the necessary current conducting carbon content may likewise be used with efficient results. One example of a compound having good electrically conducting qualities used in coating the sheets 24 and 25 is as follows:

| | |
|---|---|
| Rubber | 100 |
| Acetylene carbon black | 85 |
| Zinc oxide | 15 |
| Antioxidant | .75 |
| Accelerator | 2.00 |
| Deodorant | .10 |
| Softener | 7.00 |
| Vulcanizing agent | .75 |

To these ingredients is added a solvent such as 1500 parts of gasoline, and the resulting mixture is applied to the fabric in the form of a cement.

The electrical current for heating the sheets 24 and 25 (Fig. 2 and Fig. 3) is supplied by conducting wires 26, 27, 28, and 29. The wires 26 and 27 are not insulated and are disposed along the marginal edges of the fabric sheet 24, the marginal edge portions being turned over the wires to form folds 30 and 31 and these folds are cemented to the fabric sheet. The wires 28 and 29 are similarly located along the edges of the sheet 25.

The fabric sheets 24 and 25 may be cemented or otherwise secured to the insulating members 21 and 22 respectively. A bolt 32 (Fig. 4) extends through the insulating panel 21 and fabric sheet 24 and forms a contact with the wire 26. A portion of the fold 30 is cut away to permit contact between the bolt 32 and the wire 26. In addition to forming electrical contact, the bolt also serves to secure the sheet 24 to the insulated panel 21. Each of the four corners of the sheets 24 and 25 are similarly constructed.

An electrical current is supplied to each of the wires 26, 27, 28, and 29 through additional insulated wires 33, 34, 35, and 36, respectively, secured to the bolt 32 at one end of the panels. The wires 33 and 34 leading to the ends of the conducting wires 26 and 27, respectively, are of different electrical potential and a similar condition exists with respect to the other unit. The insulated wires 33, 34, 35, and 36 extend to form a cable 37 which connects with a conventional plug 38 (Fig. 1) adapted to contact with a source for supplying electrical energy.

To compensate for variable temperatures due to climatic conditions, a suitable conventional thermostatic device (not shown) may be incorporated with the brooder and connected with the electrical supply lines.

From the foregoing description it is believed apparent that the invention provides a novel method of supplying heat to a brooder or like article in the form of infra-red rays arranged to transmit a mild heat uniformly and efficiently distributed. While I have thus shown and described a preferred embodiment of my invention, it is to be understood that it is susceptible of modifications as appearing within the scope of the invention and as indicated by the appended claims.

Having thus shown and described my invention, what I claim and desire to protect by Letters Patent is:

1. A brooder comprising a confining enclosure having a floor and cover, a canopy supported in spaced relation between the floor and cover, heating units secured to the lower face of the canopy to direct heat rays towards the floor, each of said units comprising a sheet material extending throughout a substantial area of the canopy, an electrically conducting layer of rubber composition carried by the sheet material and forming a conductor sheet of substantial area adapted to dissipate heat uniformly therefrom, and spaced parallel conductor wires secured to the opposite marginal portions of the conductor sheet, whereby when an operating current is supplied to said wires it will be conducted by the conductor sheet laterally from one wire to the other to heat the brooder to a temperature within a few degrees of the temperature of the heating sheet.

2. A brooder comprising a confining enclosure having a floor and a canopy supported in spaced relation to the floor, heating units secured to the lower face of the canopy to direct heat rays towards the floor, each of said units comprising a sheet material extending throughout a substantial area of the canopy, an electrically conducting layer of plastic material containing current conducting carbon carried by the sheet material and forming a conductor sheet of substantial area adapted to dissipate heat uniformly therefrom, and spaced parallel conductor wires secured to the opposite marginal portions of the conductor sheet, whereby when an operating current is supplied to said wires it will be conducted by the conductor sheet laterally from one wire to the other to heat the brooder to a temperature within a few degrees of the temperature of the heating sheet.

LOUIS MARICK.